(12) United States Patent
Chandrasekaran

(10) Patent No.: US 8,923,442 B2
(45) Date of Patent: Dec. 30, 2014

(54) REFERENCE VOLTAGE GENERATION IN A SINGLE-ENDED RECEIVER

(71) Applicant: Rambus Inc., Sunnyvale, CA (US)

(72) Inventor: Srinivasaraman Chandrasekaran, Tamil Nadu (IN)

(73) Assignee: Rambus Inc., Sunnyvale, CA (US)

( * ) Notice: Subject to any disclaimer, the term of this patent is extended or adjusted under 35 U.S.C. 154(b) by 25 days.

(21) Appl. No.: 13/729,210

(22) Filed: Dec. 28, 2012

(65) Prior Publication Data

US 2013/0202061 A1    Aug. 8, 2013

Related U.S. Application Data

(60) Provisional application No. 61/596,383, filed on Feb. 8, 2012.

(51) Int. Cl.
*H04L 25/06* (2006.01)

(52) U.S. Cl.
CPC .............. *H04L 25/06* (2013.01); *H04L 25/063* (2013.01)
USPC .............. 375/317; 375/224; 702/85; 714/715

(58) Field of Classification Search
CPC .............. H04B 1/00; H04B 3/00; H04B 7/00; H04B 14/00; H04B 17/00; H04B 2001/00; H04B 2201/00; H04J 13/00; H04J 2013/00; H03K 7/00; H03K 9/00; H03L 7/00; H04L 1/00; H04L 5/00; H04L 7/00; H04L 25/00; H04L 27/00; H04L 2001/00; H04L 2007/00; H04L 2025/00; H04L 2027/00; H03M 5/00
See application file for complete search history.

(56) References Cited

U.S. PATENT DOCUMENTS

| | | | |
|---|---|---|---|
| 7,054,771 B2 | 5/2006 | Batra et al. | |
| 7,133,945 B2 | 11/2006 | Lau | |
| 7,162,376 B2 | 1/2007 | Oh et al. | |
| 7,236,894 B2 | 6/2007 | Oh et al. | |
| 7,437,633 B1 * | 10/2008 | Lesea et al. | 714/725 |
| 7,991,098 B2 | 8/2011 | Hollis | |
| 2013/0279226 A1 * | 10/2013 | Ofek | 363/127 |

* cited by examiner

*Primary Examiner* — Adolf Dsouza
(74) *Attorney, Agent, or Firm* — Hamilton, Brook, Smith & Reynolds, P.C.

(57) ABSTRACT

As single-ended signaling is implemented in higher-speed communications, accurate and consistent reading of the data signal becomes increasingly challenging. In particular, single-ended links can be limited by insufficient timing margins for sampling a received input signal. A single ended receiver provides for improved timing margins by adjusting a reference voltage used to sample the input signal. A calibration pattern is provided to the receiver as the input signal, and the reference voltage is adjusted toward a median value of the signal.

20 Claims, 8 Drawing Sheets

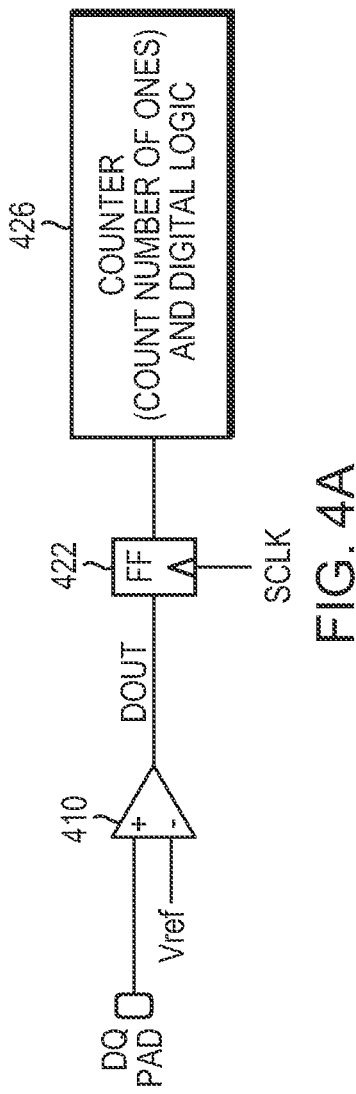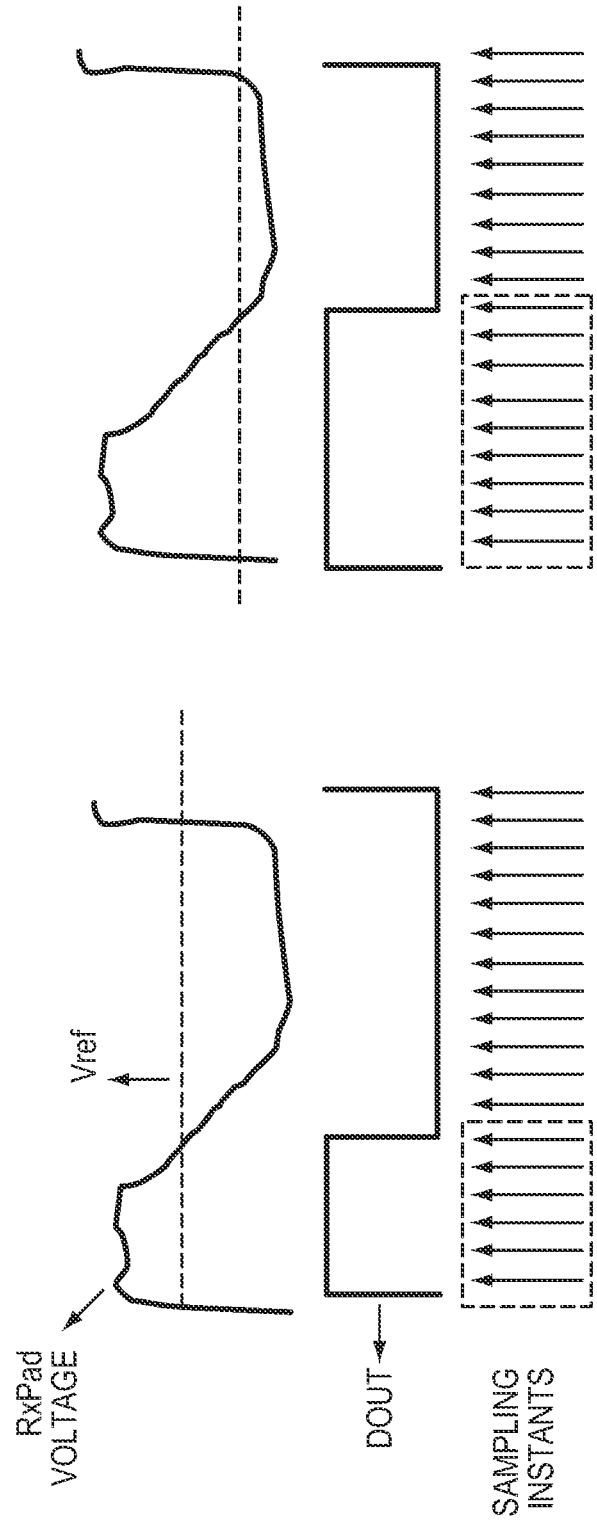
FIG. 4A
FIG. 4B
FIG. 4C

| ASSUMED Rx SENSITIVITY | USING AVERAGE OF hi/lo (ps) | USING MEDIAN (ps) | EXTRA EYE OPENING WITH MEDIAN (%) |
|---|---|---|---|
| 50 mV | 113 | 135 | 19 |
| 100 mV | 100 | 122 | 22 |
| 150 mV | 86 | 105 | 22 |
| 200 mV | 70 | 87 | 24 |

REFERENCE VOLTAGE GENERATION IN A SINGLE-ENDED RECEIVER

REFERENCE VOLTAGE GENERATION IN A SINGLE-ENDED RECEIVER

This application claims the benefit of U.S. Provisional Application No. 61/596,383, filed on Feb. 8, 2012.

The entire teachings of the above application are incorporated herein by reference.

BACKGROUND OF THE INVENTION

Single-ended signaling is a common method for transferring data between links in applications of high-speed data transmission, such as data exchange at a memory subsystem. In contrast to differential signaling, single ended links typically employ a single wire per channel of data transmission, and may further employ a clock or strobe signal for capturing the data signal at the receiver. A typical single-ended receiver compares a received data signal against a reference voltage to determine the "high" and "low" bits of the data signal, thereby deriving the content of the data transmission. By employing fewer wires and therefore requiring less power to drive signal transfer, single-ended signaling can be advantageous over alternative methods of signaling in high-speed data applications.

BRIEF DESCRIPTION OF THE DRAWINGS

The foregoing will be apparent from the following more particular description of example embodiments of the invention, as illustrated in the accompanying drawings in which like reference characters refer to the same parts throughout the different views.

The drawings are not necessarily to scale, emphasis instead being placed upon illustrating embodiments of the present invention.

FIG. 4A is a block diagram of a portion of a receiver in one embodiment.

FIGS. 4B-C are timing diagrams illustrating sampling of an input signal at the portion of the receiver.

FIG. 7 is a table illustrating improvements in receiver performance provided by example embodiments.

DETAILED DESCRIPTION OF THE INVENTION

A description of example embodiments follows.

As single-ended signaling is implemented in higher-speed communications, accurate and consistent reading of the data signal becomes increasingly challenging. In particular, each bit carried by the data signal must be read (i.e., latched) at a receiver within a lesser period of time, decreasing the margin of error at a single-ended receiver. Single-ended links may perform capably at increasingly lower voltages. Thus, in some applications, single-ended links may be limited by timing (e.g., maximum operable frequency) rather than by voltage (e.g., minimum operable voltage swing).

Example embodiments, described below, provide for improved timing margins by adjusting a reference voltage used to sample the input signal. A calibration pattern is provided to the receiver as the input signal, and the reference voltage is adjusted toward a median value of the signal. As a result, the receiver provides for reading received single-ended data in a manner enabling accurate data transfer at higher speeds.

Figure 1A:
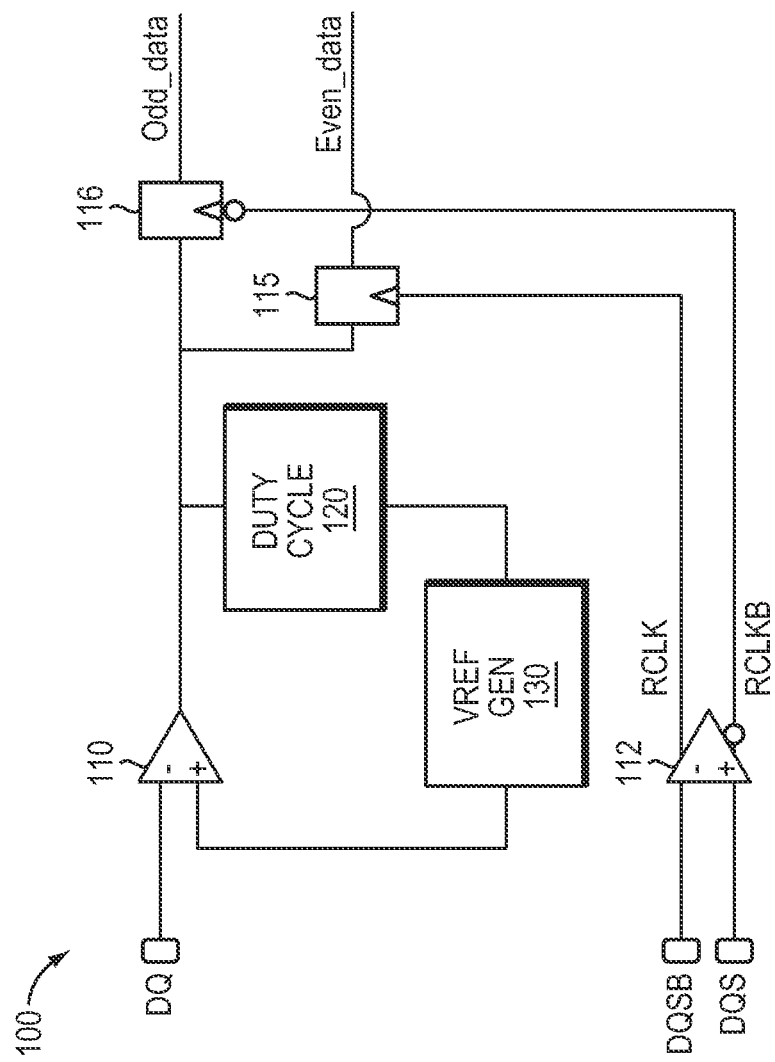
FIG. 1A is a circuit diagram of a single-ended receiver in one embodiment.

FIG. 1A is a circuit diagram of a strobed single-ended receiver 100 in one embodiment. A single-ended input signal DQ and accompanying differential data strobe signal DQS, DQSB are received at comparators 110 and 112, respectively. The comparator 110 compares the input signal DQ against a reference voltage, generated by a reference voltage generator circuit 130, and outputs a digital output signal corresponding to the input signal DQ. Likewise, the comparator 112 receives the differential data strobe signal DQS, DQSB, comparing the signal components DQS and DQSB against one another to generate the signals RCLK and RCLKB for controlling latches 115, 116. The digital output signal is then latched at the latches 115, 116. As a result, the latches 115, 116 alternately capture bits of the data signal corresponding to the input signal DQ. In alternative embodiments, the data strobe signal may be a single-ended signal that is compared against a reference voltage (e.g., the reference voltage generated by the generator circuit 130).

In order to improve timing margins and accuracy of the receiver 100, the reference voltage generator circuit 130 may adjust the reference voltage based on the calculated duty cycle of the digital output signal as provided by a circuit for calculating duty cycle 120. Operation of this circuitry is described in further detail below with reference to FIG. 1B.

Figure 1B:
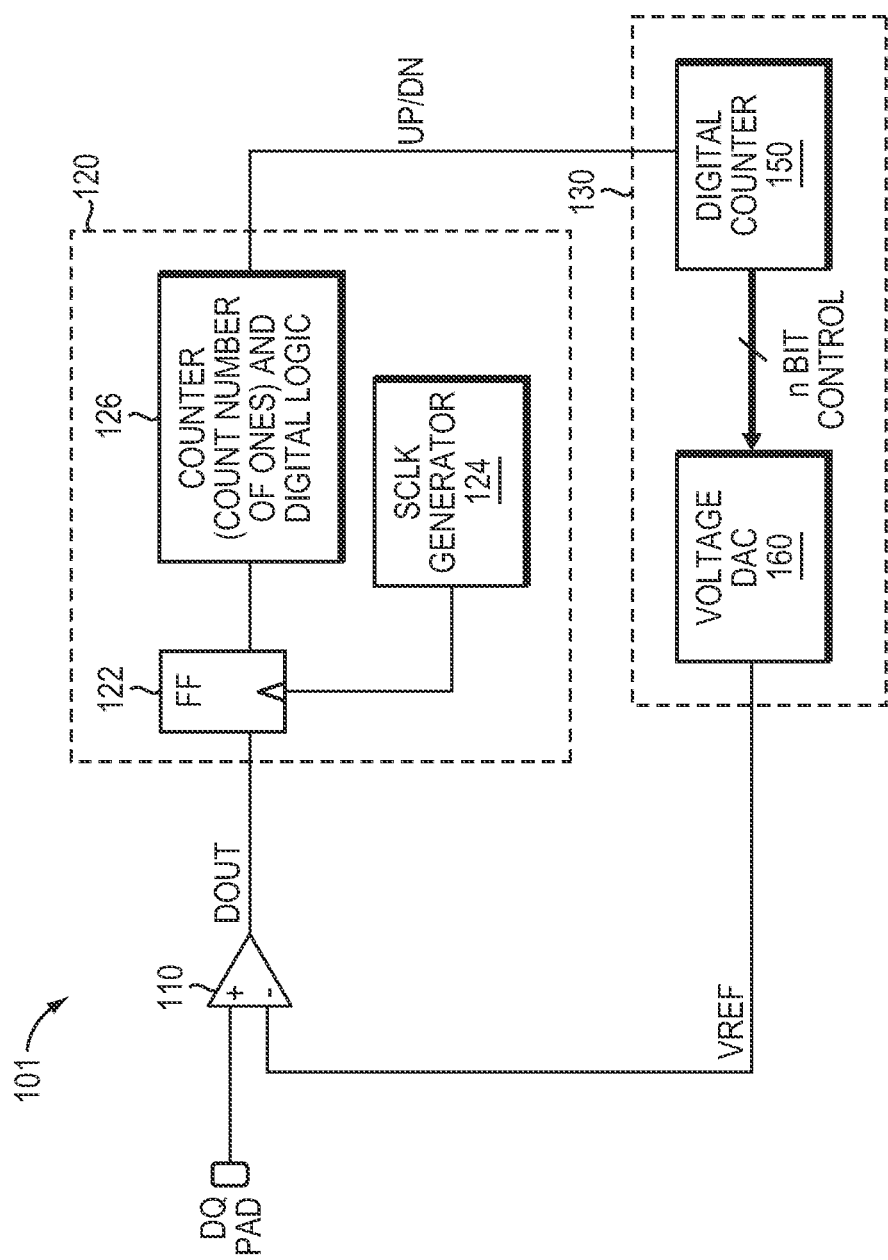
FIG. 1B is a circuit diagram of a portion of a single-ended receiver in one embodiment.

FIG. 1B is a circuit diagram of a portion of a single-ended receiver 101 in one embodiment. The portion 101 may be implemented in the single-ended receiver 100 described above with reference to FIG. 1A. A comparator 110 receives a single-ended input signal DQ and compares it against a reference voltage Vref. For the purposes of calibrating the reference voltage as described below, the input signal DQ may be an oscillating signal providing an alternating digital pattern of "high" and "low" states. The comparator generates a digital output signal $D_{OUT}$ based on this comparison, which in turn is received at a circuit 120 for calculating the duty cycle of the output signal $D_{OUT}$. The circuit 120 includes a latch 122 (e.g., a flip-flop), a sample clock generator 124, and a counter circuit 126. The latch 122 captures the state of $D_{OUT}$ according to the sample clock generator 124, thereby sampling $D_{OUT}$ over one or more periods of Dout. The counter circuit 126 receives the sampled states of $D_{OUT}$ and maintains a count over a predetermined period of time. Based on this count, the counter circuit 126 may determine the duty cycle of $D_{OUT}$, being a ratio of the time $D_{OUT}$ exhibits a "high" state against the total time over a given cycle, and can be calculated based on the ratio of the number of "high" and "low" states captured by the latch 122. Sampling of $D_{OUT}$ and calculation of the duty cycle is described in further detail below with reference to FIGS. 4A-C.

The counter circuit 126 further compares the calculated duty cycle against a reference value. For example, the receiver portion 101 may be configured to obtain a $D_{OUT}$ duty cycle of 50% or some other value to enable sufficient register of the received data signal DQ. Thus, for a target duty cycle of 50%, the counter circuit 126 may compare the calculated duty cycle of $D_{OUT}$ against a duty cycle of 50%, thereby determining whether the $D_{OUT}$ duty cycle is greater or less than the target value. In accordance with this determination, the counter circuit 126 may generate a command signal (e.g., "UP" or "DN") to adjust the reference Voltage Vref, which in turn causes an adjustment in the duty cycle of $D_{OUT}$ toward the target duty cycle.

At a reference voltage generator circuit 130, a voltage digital-to-analog converter (DAC) 160 generates the reference voltage Vref according to an n-bit digital control signal provided by a digital counter 150. In response to receiving the command signal from the counter circuit 126, the digital counter 150 in turn adjusts the voltage DAC 160, via the n-bit control signal, to increase or decrease the reference voltage Vref. As a result, the receiver portion 101 adjusts the reference voltage Vref based on the calculated duty cycle of $D_{OUT}$ to move the reference voltage Vref toward a target value. The target value for Vref may be a value that results in a duty cycle of $D_{OUT}$ that matches (or is within a tolerance value of) a target value, such as 50%. A value of the reference voltage Vref that results in a duty cycle of 50% may be considered to be a median value of the received input signal DQ (i.e., the value at which the input signal DQ occupies both above and below at equal periods of time).

The adjustment provided by the digital counter 150 may be a single fixed increment per feedback cycle. Alternatively, the counter circuit 126 may be configured to generate a command signal having both a direction (e.g., "UP" or "DN") and a magnitude (e.g., a value within a fixed range) corresponding to a magnitude of the determined adjustment. The digital counter 150, in turn, may issue an adjustment to the reference voltage Vref of a corresponding direction and magnitude.

Figure 2A:
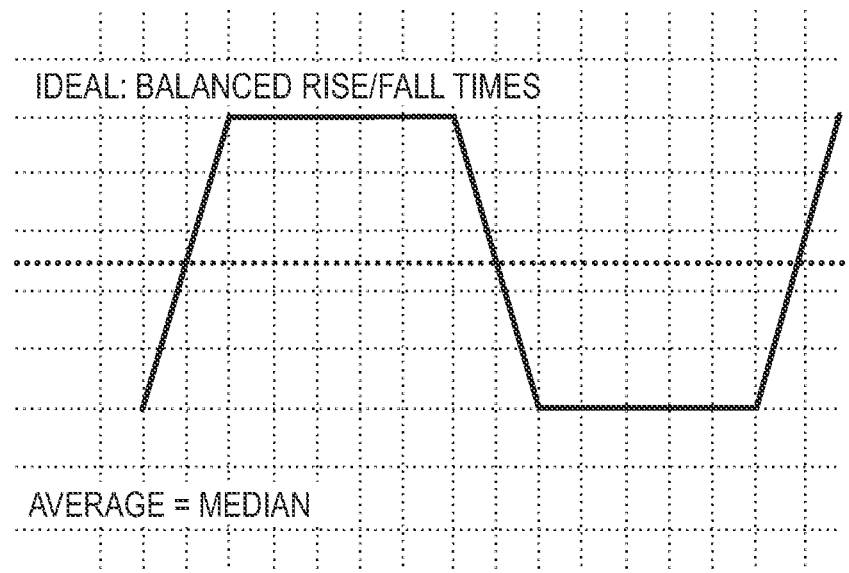
FIGS. 2A-B are timing diagrams illustrating a reference voltage and input signal at a receiver in one embodiment.
Figure 2B:
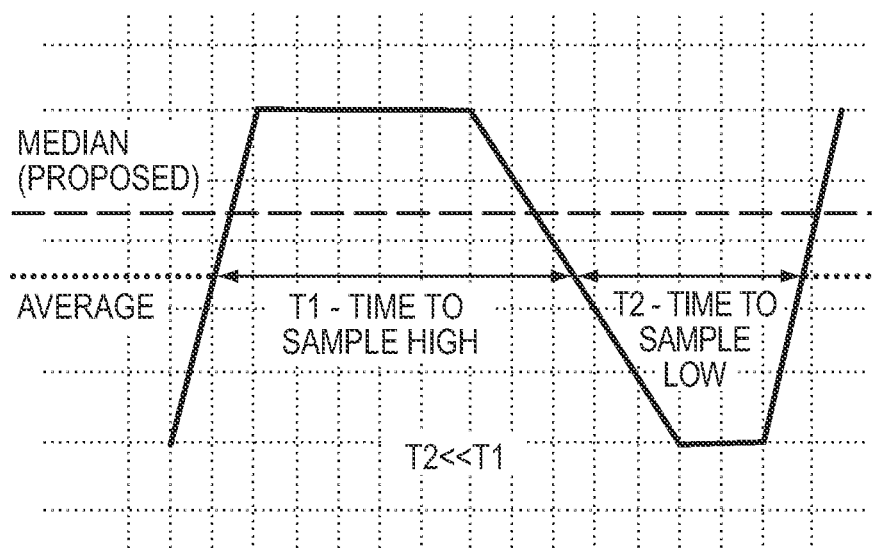

FIGS. 2A-B are timing diagrams illustrating a reference voltage and input signal at a receiver in both an ideal scenario and in an example embodiment. FIG. 2A illustrates an "ideal" single-ended input signal, wherein the time at both "high" and "low" states are equal, as well as the rise and fall times between those states. The "average" value of the waveform may be defined as the voltage that is half of the difference between the "high" and "low" states. In contrast, the "median" voltage may be defined as the voltage at which the input signal occupies both above and below at equal periods of time. The "ideal" signal, when oscillating between alternating "high" and "low" states (e.g., as a clock signal), provides a median voltage that is equivalent to the average voltage. Thus, if a received input signal resembles the "ideal" signal, the signal may be best sampled by configuring a receiver circuit to have a reference voltage equal to the average value, thereby providing equal time periods for sampling both the "high" and "low" states of the input signal.

However, due to various limitations of single-ended link circuitry, a received single-ended signal may not exhibit balanced rise and fall times, nor may it occupy "high" and "low" states at even time periods. FIG. 2B illustrates one example of a "non-ideal" single-ended input signal, wherein the rise time is significantly shorter than the fall time, and the time at the "high" state is notably higher than the time at the "low" state. The "average" value is unchanged from the "ideal" signal described above. However, if a reference voltage Vref were configured to match the average value, then the time available to sample the "high" state (T1) is significantly longer than the time available to sample the "low" state (T2). As a result, a receiver configured in this way may not be capable of accurately sampling the received "non-ideal" single-ended signal.

In contrast, a median voltage of the input signal, as shown in FIG. 2B, divides the "non-ideal" signal such that the signal occupies both above and below the division in equal portions. Thus, by adjusting the reference voltage toward the median value of a input signal having an oscillating waveform, a single-ended receiver 100 as described above can provide equal time periods for sampling both "high" and "low" states of a received signal, thereby enabling improving timing margins for accurate sampling at higher transfer frequencies.

Figure 3:
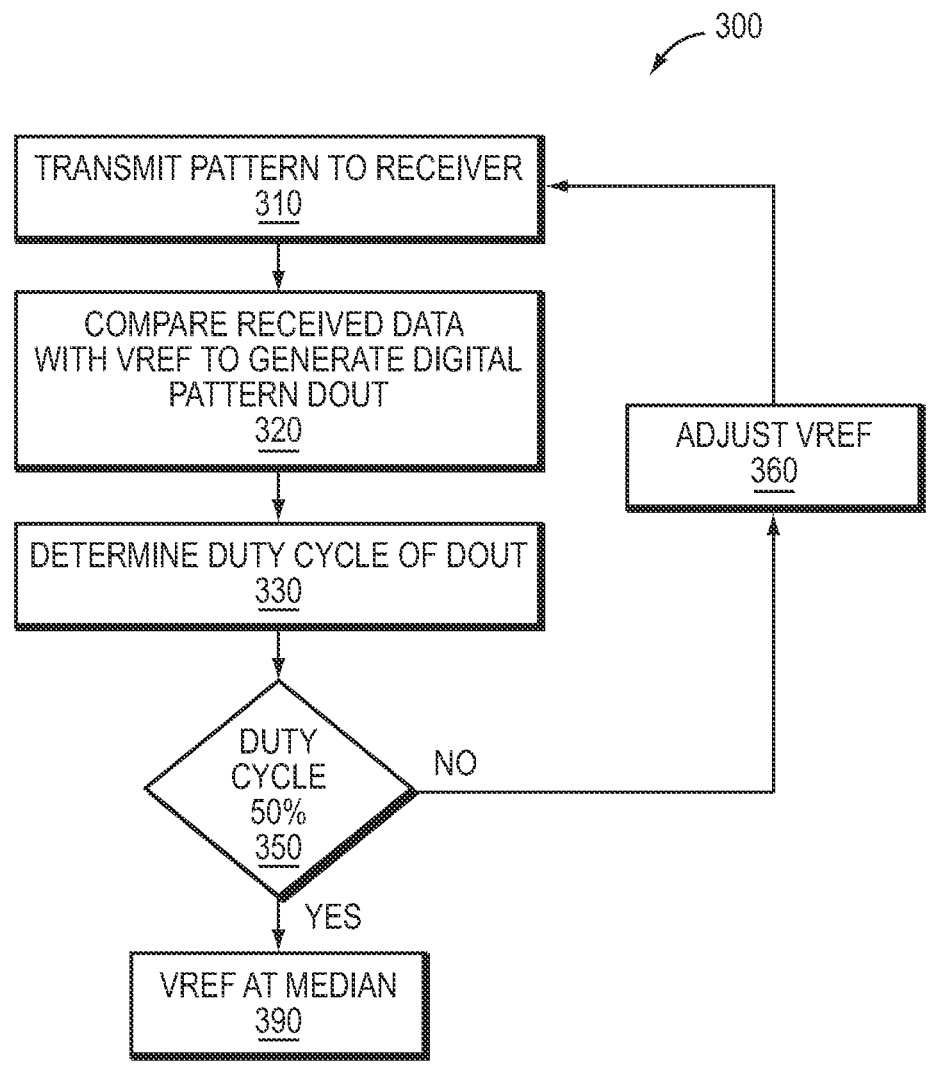
FIG. 3 is a flow diagram illustrating a process of adjusting a reference voltage at a receiver in one embodiment.

FIG. 3 is a flow diagram illustrating a process 300 of adjusting a reference voltage at a receiver in one embodiment. With reference to FIGS. 1A-B, a single-ended link may be selected to enter a configuration mode, causing the corresponding transmitter to transmit a single-ended signal DQ as a calibration pattern, such as an alternating "high" and "low" pattern, to a receiver 100 (310). The input signal DQ is compared against the reference Voltage Vref, generating a corresponding digital signal $D_{OUT}$ (320). The signal $D_{OUT}$ may be considered to be a sampled digital embodiment of the received input signal DQ. The duty cycle of the signal $D_{OUT}$ is then determined (e.g., at the circuit 120) (330). The duty cycle is then compared against a target value (350). If the duty cycle is not equal to (or within a tolerance value of) the target value (e.g, 50%), then the reference voltage Vref is adjusted (via the digital counter 150 and voltage DAC 160) to provide a duty cycle closer to that of the target value (360).

The steps of transmitting (310), comparing (320), determining duty cycle (330) comparing the duty cycle against a target value (350), and adjusting the reference voltage Vref (360) may be repeated until the duty cycle is equal to (or within a tolerance value of) the target value (e.g, 50%). Once this occurs, the reference voltage Vref is determined to be at the target value (e.g., the median of the calibration pattern) (390). Once the target is reached, the process 300 may terminate, and the reference voltage Vref is maintained at the adjusted value for the sampling of a single-ended data signal at the receiver 100. The process 300 may be repeated periodically, in response to a command, or in response to detecting a change in the received data signal (e.g., a replacement of the signal source) as required to maintain accurate sampling of the input signal at the receiver 100.

FIGS. 4A is a block diagram of a portion of a receiver in one embodiment, configured for calculating the duty cycle of a received single-ended signal. A comparator 410, latch 422 and counter circuit 426 may be comparable to the comparator 110, latch 122 and counter circuit 126, respectively, as described above with reference to FIG. 1. The comparator 410 generates a digital output signal $D_{OUT}$ based on the comparison of the input signal DQ against a reference voltage Vref. The latch 422 captures the state of $D_{OUT}$ according to the sample clock SCLK, thereby sampling $D_{OUT}$ over one or more periods of Dout. The counter circuit 126 receives the sampled states of $D_{OUT}$ and maintains a count over a predetermined period of time. Based on this count, the counter circuit 126 may determine the duty cycle of $D_{OUT}$, being a ratio of the time $D_{OUT}$ exhibits a "high" state versus a "low" state over a given cycle, and can be calculated based on the ratio of the number of "high" and "low" states captured by the latch 422. In order to accurately sample $D_{OUT}$ to determine its duty cycle, the sample clock generator (e.g., generator 124 in FIG. 1) may provide the sample clock SCLK at a frequency substantially higher than that of $D_{OUT}$. Alternatively, the sample clock SCLK may be at a frequency equal to or lower than $D_{OUT}$, where the counter circuit 426 counts the state of $D_{OUT}$ over several periods of $D_{OUT}$, thereby ensuring a count that accurately indicates the duty cycle of $D_{OUT}$.

FIGS. 4B-C are timing diagrams illustrating sampling of the input signal, as well as the calculating the duty cycle of $D_{OUT}$ at the portion of the receiver described above. As shown in FIG. 4B, the input signal DQ exhibits a relatively short "high" state time, and a long fall time to the "low" state.

As a result of a reference voltage having the "average" value of the input signal, the sampled input signal $D_{OUT}$ has a duty cycle substantially less than 50%. This duty cycle is then measured by several "sampling instants" captured by the latch 422. In the example shown, the sampling instants are captured at a frequency substantially higher than that of $D_{OUT}$, thereby providing an accurate measure of the duty cycle of $D_{OUT}$ within a single period of $D_{OUT}$. As shown in FIG. 4B, a total of 6 "high" states are captured out of a total of 18, indicating a duty cycle of approximately 33%. The counter circuit 426, upon calculating this duty cycle, compares it to a target duty cycle, which may be 50%. In response to the duty cycle failing to match (or arrive within a tolerance value of) the target duty cycle, the counter circuit 426 generates a command signal to adjust the reference voltage Vref. By adjusting the reference voltage Vref to a value closer to that of the median value of the input signal DQ, the duty cycle is in turn adjusted toward a value of 50%.

FIG. 4C is a timing diagram illustrating the calculated duty cycle following adjustment of the reference voltage Vref as described above. The input signal DQ is identical to the signal shown in FIG. 4B; however, the reference voltage Vref is now at a lower value, approximating the median value of the input signal DQ. As a result, a total of 9 "high" states are captured out of a total of 18, indicating a duty cycle of $D_{OUT}$ of approximately 50%. If the counter circuit 426 is configured with a target duty cycle of 50%, then the circuit 426 may respond to a match between the duty cycle and the target by issuing a further command to terminate the calibration process and maintain the reference voltage Vref at the adjusted value.

Figure 5:
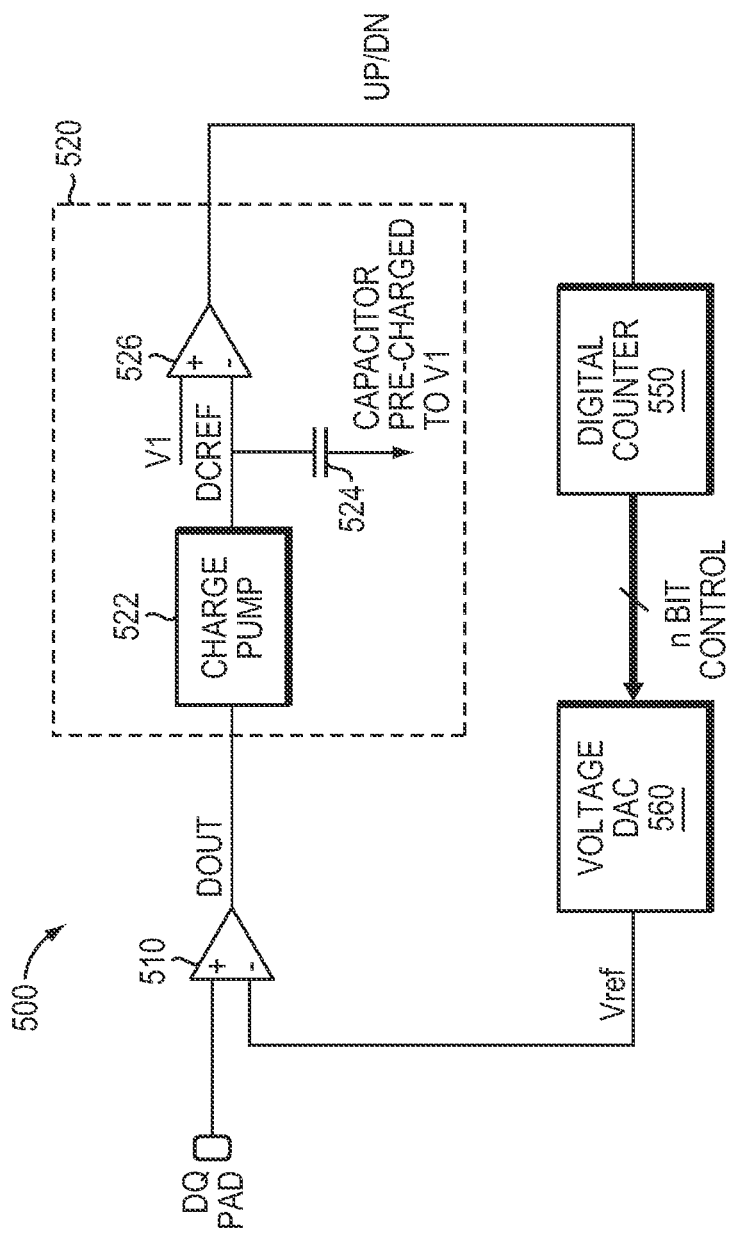
FIG. 5 is a circuit diagram of a single-ended receiver in a further embodiment.

FIG. 5 is a circuit diagram of a portion of a single-ended receiver 500 in a further embodiment. The receiver 500 may be configured and operate in a manner comparable to the receiver portion 101 described above with reference to FIG. 1B. A comparator 510 receives a single-ended input signal DQ and compares it against a reference voltage Vref. The comparator 510 generates a digital output signal $D_{OUT}$ based on this comparison, which in turn is received at a circuit 520 for calculating the duty cycle of the output signal $D_{OUT}$. The circuit 520 includes a charge pump 522, a capacitor 524, and a comparator 526. The charge pump 122 receives the signal $D_{OUT}$ and outputs a corresponding signal to the capacitor 524 to generate DC signal DCref. The comparator 526 compares a voltage V1 against the signal DCref at a node shared by the capacitor 524, which is pre-charged to a voltage equal to V1. The comparator 526 outputs a voltage having a value that corresponds to whether the duty cycle of $D_{OUT}$ is above, below, or matches the target value (e.g., 50%). The comparator 526 output thus can be interpreted as a command signal (e.g., "UP" or "DN") for adjusting the value of the reference voltage Vref, which in turn causes an adjustment in the duty cycle of $D_{OUT}$ toward the target duty cycle.

A voltage digital-to-analog converter (DAC) 560 generates the reference voltage Vref according to an n-bit digital control signal provided by a digital counter 550. In response to receiving the command signal from the comparator 526, the digital counter 550 in turn adjusts the voltage DAC 560, via the n-bit control signal, to increase or decrease the reference voltage Vref. As a result, the receiver 500 adjusts the reference voltage Vref based on the calculated duty cycle of $D_{OUT}$ to move the reference voltage Vref toward a target value. The target value for Vref may be a value that results in a duty cycle of $D_{OUT}$ that matches (or is within a tolerance value of) a target value, such as 50%. As described above, a value of the reference voltage Vref that results in a duty cycle of 50% may be considered to be a median value of the received input signal DQ (i.e., the value at which the input signal DQ occupies both above and below at equal periods of time).

Figure 6A:
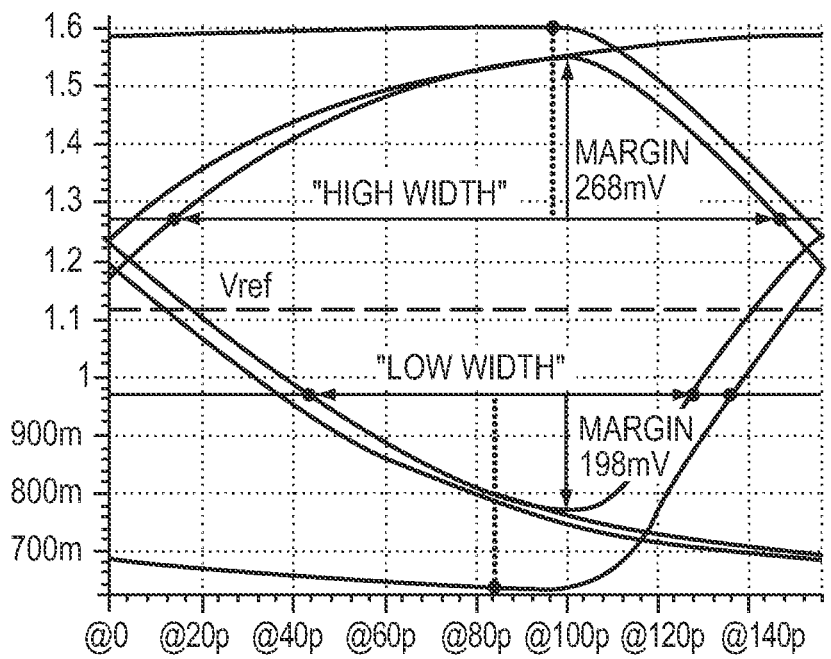
FIGS. 6A-B are signal trace diagrams illustrating a reference voltage and input signal at a receiver in one embodiment.
Figure 6B:
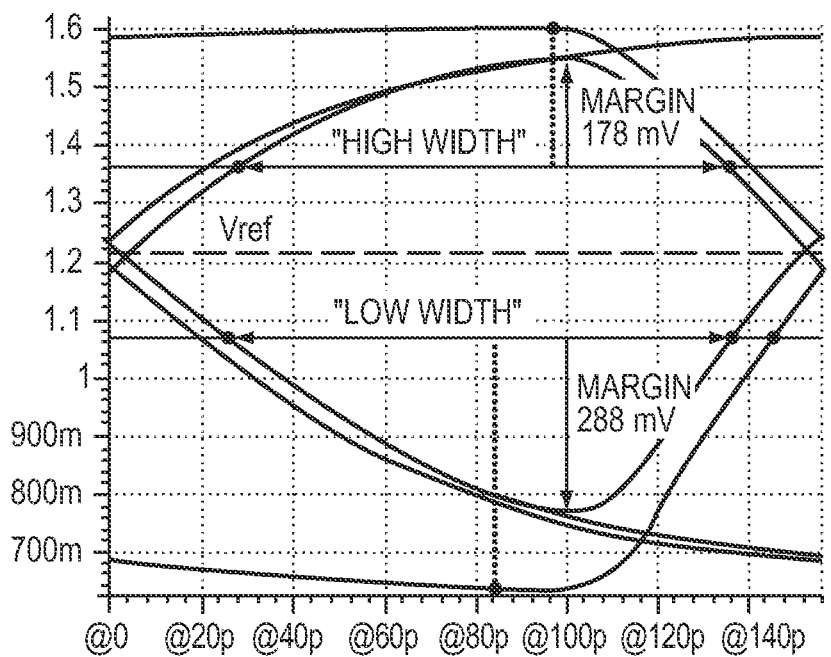

FIGS. 6A-B are signal trace diagrams providing an example illustration of improved signal sampling as a result of adjusting the reference voltage in the embodiments described above. FIG. 6A shows several traces of an input signal superimposed on one another, where a reference voltage Vref is set to an average of the "high" and "low" states of the signal. The signal traces are derived from a circuit simulation operating at a speed of 6.4 GBps. Provided that the input signal must have a minimum value (e.g., 150 mV) above or below the reference voltage Vref to be sampled by the receiver, the time period for sampling the "high" and "low" states is limited to the periods shown as the "hi width" and "lo width." The "hi width" shows a margin of 268 mV from the maximum swing voltage, while the "lo width" shows a margin of 198 mV from the minimum swing voltage. In can be seen that the "hi width" period (132 ps) is substantially larger than the "lo width" period (86 ps), meaning that the opportunity for sampling a "low" state of the received signal may be insufficiently low.

FIG. 6B illustrates the same signal traces of an input signal as shown in FIG. 6A, but with a reference voltage Vref adjusted to the median value of the input signal. As a result, the corresponding "hi width" and "lo width" levels are adjusted upwards, and the lengths of each are approximately equal (105/110 ps), representing equal timing margins for sampling both "high" and "low" states, and a sampling "eye" for the "low" state that is 22% wider than the period shown in FIG. 6A. The margins between the "hi width" and "lo width" levels and the maximum and minimum swing voltages are also adjusted to 178 mV and 288 mV, respectively. A receiver may be configured to limit adjustment of the reference voltage Vref so as to ensure that the margins remain at a minimum value.

FIG. 7 is a table illustrating improvements in receiver performance as a function of the voltage sensitivity of a receiver. The table indicates an given receiver sensitivity (i.e., the minimum distance from Vref for registering "high" and "low" states, ranging from 50 mV to 200 mV). For a given receiver sensitivity, a second column indicates a minimum time period for sampling either the high or low state when the reference voltage Vref is configured to the average value of the "high" and "low" states. In contrast, the third column indicates the minimum time period for sampling either the high or low state when the reference voltage Vref is configured to the median voltage of the input signal pattern. The fourth column indicates the additional "eye opening" for sampling the "high" or "low" states when adjusting the reference voltage Vref to the median value. It can be seen that, as the sensitivity of the receiver decreases (towards 200 mV), percentage of the additional "eye opening" increases, thereby providing an increasing advantage over a reference voltage Vref adjusted to the average of the "high" and "low" states.

While this invention has been particularly shown and described with references to example embodiments thereof, it will be understood by those skilled in the art that various changes in form and details may be made therein without departing from the scope of the invention encompassed by the appended claims.

What is claimed is:

1. A method of calibrating a receiver for receiving a signal, comprising:
sampling a input signal against a reference voltage to generate a sampled input signal;
calculating a duty cycle of the sampled input signal; and
adjusting the reference voltage based on the duty cycle;

wherein adjusting the reference voltage includes adjusting the reference voltage to move the reference voltage toward a median value of the input signal.

2. The method of claim 1, wherein adjusting the reference voltage includes:
comparing the duty cycle against a duty cycle of 50%; and
determining adjustment to the reference voltage such that the duty cycle is moved towards 50%.

3. The method of claim 1, wherein the input signal corresponds to a digital pattern having an equal number of high and low bits.

4. The method of claim 3, wherein the input signal is generated by an oscillator circuit.

5. The method of claim 1, wherein sampling the input signal includes sampling the input signal at a frequency higher than a frequency of the input signal.

6. The method of claim 1, wherein sampling the input signal includes sampling the input signal at a frequency lower than a frequency of the input signal and over a duration of more than one cycle of the input signal.

7. A method of calibrating a receiver for receiving a signal, comprising:
sampling a input signal against a reference voltage to generate a sampled input signal;
calculating a duty cycle of the sampled input signal; and
adjusting the reference voltage based on the duty cycle;
wherein adjusting the reference voltage includes adjusting the reference voltage to match the median value of the input signal.

8. The method of claim 7, wherein adjusting the reference voltage includes:
comparing the duty cycle against a duty cycle of 50%; and
determining adjustment to the reference voltage such that the duty cycle is 50%.

9. A method of calibrating a receiver for receiving a signal, comprising:
sampling a input signal against a reference voltage to generate a sampled input signal;
calculating a duty cycle of the sampled input signal; and
adjusting the reference voltage based on the duty cycle;
further comprising repeating the steps of sampling, calculating and adjusting until the reference voltage is equivalent to a median value of the input signal within a tolerance value.

10. A circuit for receiving a signal, comprising:
a comparator for receiving a input signal, the comparator configured to generate a digital input signal based on a comparison of the input signal against a reference voltage;
a circuit configured to calculate a duty cycle of the digital input signal; and
a control circuit configured to adjust the reference voltage based on the duty cycle;
wherein the control circuit is further configured to adjust the reference voltage based on the duty cycle to move the reference voltage toward a median value of the input signal.

11. The circuit of claim 10, wherein the circuit is further configured to sample the digital input signal.

12. The circuit of claim 11, wherein the circuit comprises:
a clock generator configured to generate a sample clock signal;
a latch configured to capture the digital input signal at a plurality of intervals according to the sample clock signal; and
a counter configured to generate a count of states of the latch, the count corresponding to the duty cycle of the digital input signal.

13. The circuit of claim 12, wherein the clock generator is configured to generate the sample clock signal at a frequency higher than a frequency of the input signal.

14. The circuit of claim 12, wherein the clock generator is configured to generate the sample clock signal at a frequency lower than a frequency of the input signal, the counter generating the count over a duration of more than one cycle of the input signal.

15. The apparatus of claim 10, wherein the control circuit adjusts the reference voltage to match the median value of the input signal.

16. The apparatus of claim 10, wherein the input signal corresponds to a digital pattern having an equal number of high and low bits.

17. The apparatus of claim 16, wherein the input signal is generated by an oscillator circuit.

18. A circuit for receiving a signal, comprising:
a comparator for receiving a input signal, the comparator configured to generate a digital input signal based on a comparison of the input signal against a reference voltage;
a circuit configured to calculate a duty cycle of the digital input signal; and
a control circuit configured to adjust the reference voltage based on the duty cycle;
wherein the circuit comprises:
a charge pump configured to receive the digital input signal and generate a corresponding output voltage;
a capacitor connected to the charge pump to receive the output voltage; and
a second comparator configured to compare a voltage at the capacitor to a second reference voltage, the second comparator providing a signal corresponding to the duty cycle of the digital input signal.

19. A circuit for receiving a signal, comprising:
a comparator for receiving a input signal, the comparator configured to generate a digital input signal based on a comparison of the input signal against a reference voltage;
a circuit configured to calculate a duty cycle of the digital input signal; and
a control circuit configured to adjust the reference voltage based on the duty cycle;
wherein the control circuit comprises:
a counter configured to compare the duty cycle against a duty cycle of 50% and outputting a control signal based on the comparison; and
a voltage digital-to-analog converter (DAC) generating the reference voltage, the voltage DAC adjusting the reference voltage according to the control signal.

20. The circuit of claim 19, wherein the counter is configured to determine adjustment to the reference voltage, via the control signal, such that the duty cycle is 50%.

* * * * *